(12) United States Patent
Warbington et al.

(10) Patent No.: US 11,759,727 B1
(45) Date of Patent: Sep. 19, 2023

(54) AQUEOUS EXTRACTION OF PROPIONITRILE FROM CHLOROPICRIN

(71) Applicant: Trinity Manufacturing, Inc., Hamlet, NC (US)

(72) Inventors: R. Keith Warbington, Pinehurst, NC (US); John Northup, Rockingham, NC (US)

(73) Assignee: Trinity Manufacturing Inc., Hamlet, NC (US)

( * ) Notice: Subject to any disclaimer, the term of this patent is extended or adjusted under 35 U.S.C. 154(b) by 0 days.

(21) Appl. No.: 17/744,236

(22) Filed: May 13, 2022

(51) Int. Cl.
*B01D 11/04* (2006.01)
*A01N 47/08* (2006.01)

(52) U.S. Cl.
CPC .......... *B01D 11/0492* (2013.01); *A01N 47/08* (2013.01); *B01D 11/0426* (2013.01); *B01D 2221/06* (2013.01)

(58) Field of Classification Search
CPC .. B01D 11/0492; B01D 11/0426; A01N 47/08
See application file for complete search history.

(56) References Cited

U.S. PATENT DOCUMENTS 9,604,153 B1 * 3/2017 Quinlan ............ H01L 21/02101

\* cited by examiner

*Primary Examiner* — Sikarl A Witherspoon
(74) *Attorney, Agent, or Firm* — William E. Noonan

(57) ABSTRACT

A method of extracting propionitrile from liquid chloropicrin includes providing a feed solution that constitutes liquid chloropicrin and a propionitrile solute dissolved therein. A liquid, water-based solvent that is immiscible with the feed solution is also provided. The feed solution and the solvent are intermixed such that the solvent absorbs and extracts at least a portion of the propionitrile solute from the feed solution. The feed solution is then separated from the solvent and extracted propionitrile solute to produce a liquid extract and a liquid raffinate, which liquid extract includes the water-based solvent and the propionitrile solute absorbed by the solvent, and which raffinate includes the feed solution from which propionitrile solute has-been extracted.

9 Claims, 4 Drawing Sheets

AQUEOUS EXTRACTION OF PROPIONITRILE FROM CHLOROPICRIN

FIELD OF THE INVENTION

This invention, relates to a method of extracting the impurity propionitrile from the fumigant chloropicrin. More particularly, the invention provides a method of efficiently and effectively reducing propionitrile from chloropicrin by aqueous extraction.

BACKGROUND OF THE INVENTION

Chloropicrin is a common and widely used soil fumigant, particularly in agricultural applications. Chloropicrin is commonly produced from nitromethane, which contains propionitrile, an environmentally undesirable impurity. In normal manufacturing processes, propionitrile generally carries through into the final chloropicrin product. The maximum permissible level of propionitrile in chloropicrin set by many worldwide governmental and regulatory bodies varies depending on where and how the chloropicrin will be used. Reducing the concentration of propionitrile in chloropicrin lessens the potential environmental risk and significantly improves the marketability of the fumigant.

To date, conventional efforts to economically and practically reduce the level of propionitrile in the nitromethane used to produce chloropicrin have been unsuccessful. Specifically, fractional distillation has been employed, but it is not economically feasible to achieve desired low levels of propionitrile by this method. A much greater reduction is needed for the propionitrile to be reduced sufficiently so that a significantly higher quality and more marketable chloropicrin is obtained. Alternative methods to remove propionitrile from the raw material nitromethane have been studied, including the use of various absorbents and extraction solvents; but, to date, no method has proven commercially practical. Likewise, there is no known commercially successful means to remove propionitrile from the final chloropicrin product itself.

SUMMARY OF THE INVENTION

It is therefore an object of the present invention to provide a method for effectively, efficiently and economically reducing the level of propionitrile in chloropicrin fumigant by means of aqueous extraction.

It is a further object of this invention to provide a method of extracting propionitrile from chloropicrin that represents a significant improvement over conventional methods such a fractional distillation or the use of selective absorbents.

It is a further object of this invention to provide a method of extracting propionitrile from manufactured chloropicrin directly rather than from the nitromethane ingredient of chloropicrin.

It is a further object of this invention to provide an aqueous extraction technique that removes propionitrile from chloropicrin by using any of various liquid-liquid extraction techniques including batch, multistage, continuous cocurrent and countercurrent processing.

It is a further object of this invention to provide an aqueous extraction technique that removes propionitrile from chloropicrin by using any of various known operating equipment suited for the purpose of performing liquid-liquid extraction such as Scheibel columns, Kuhni columns, Treybal towers, Karr reciprocating towers, rotating disc columns, pulsed columns, and many others.

It is a further object of this invention to provide a method for producing a high quality chloropicrin fumigant with a reduced propionitrile level, a reduced potential for adverse environmental effect, a lower cost of manufacture, and expanded commercial marketability.

This invention results from the realization that propionitrile can be removed more effectively and efficiently from a manufactured chloropicrin fumigant by means of aqueous liquid-liquid extraction. Such extraction can be made by employing a water-based solvent, which may be either pure water or an aqueous solution, to extract the propionitrile from the final manufactured chloropicrin fumigant. Such extraction can be made, using various types of liquid-liquid extraction equipment and processing techniques including batch, multistage, cocurrent and/or countercurrent continuous or multistage batch processing.

This invention features a method of extracting propionitrile from liquid chloropicrin. The method includes providing a feed solution that includes liquid chloropicrin with a propionitrile solute dissolved therein. A liquid, water-based (aqueous) solvent that is immiscible with the feed solution is also provided. The feed solution and the solvent are intermixed such that the solvent absorbs and extracts at least a portion of the propionitrile solute from the feed solution. The feed solution is then separated from the solvent and extracted propionitrile to produce a liquid extract and a liquid raffinate. The liquid extract includes the water-based solvent and propionitrile solute absorbed by the solvent. The raffinate includes the feed solution from which the propionitrile solute has been extracted.

The liquid solvent and feed solution may be intermixed in a single batch process or in a multistage batch process. The liquid solvent and solution may be intermixed in a countercurrent multistage batch process. The liquid solvent and solution may be intermixed in a cocurrent or counter current continuous process.

In a preferred embodiment, the liquid solvent consists of water, or alternatively includes an aqueous solution. An aqueous solvent stream and chloropicrin feed stream may be fed at opposite ends of a mixing unit or series of multiple mixing units in which the streams are in continuous contact with one another but flow in countercurrent directions consistent with the normal art of continuous countercurrent liquid-liquid extraction. Such a continuous countercurrent arrangement allows for a high concentration of propionitrile solute in the final extract such that the reduced target level of propionitrile in the final chloropicrin raffinate product can be achieved with a minimal use of solvent. That product, low in PN, may then be dried to prevent decomposition into corrosive compounds. The spent extract may be regenerated by distillation to remove the PN solute so that it may be reused subsequently as fresh solvent.

BRIEF DESCRIPTION OF THE DRAWINGS

Other objects, features and advantages will occur from the following description of a preferred embodiment and the accompanying drawings, in which.

DETAILED DESCRIPTION OF PREFERRED EMBODIMENTS

Figure 1:
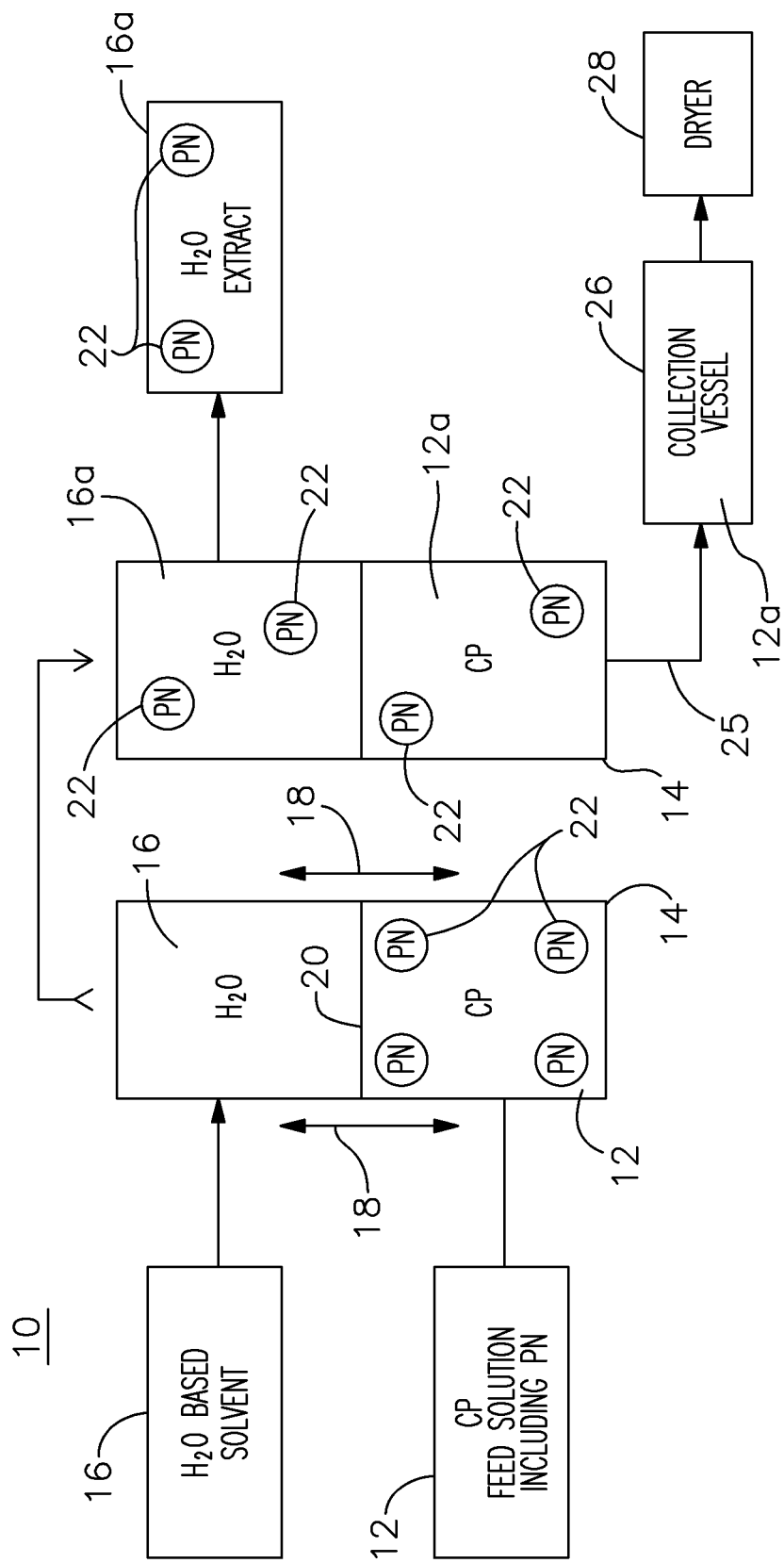
FIG. 1 is a schematic view illustrating a single batch aqueous extraction method for reducing the level of propionitrile in chloropicrin in accordance with this invention.

There is shown in FIG. 1 a schematic diagram that depicts a method of extracting propionitrile (PN) from the fumigant chloropicrin (CP) in an extremely cost efficient and effective manner. It should be understood that the method of this invention may be practiced using various known types of liquid extraction equipment. The particular equipment and hardware for practicing the extraction technique will be understood to persons skilled in the art and do not constitute a limitation of this invention.

FIG. 1, by itself, discloses a method 10 that employs a single batch extraction technique. Initially chloropicrin is produced in a conventional manner by reacting the raw material nitromethane with other chemical components. This manufactured chloropicrin (CP) includes the propionitrile (PN) impurity that requires reduction. A liquid CP feed solution 12 which includes PN solute is prepared as a feed solution and provided to a vessel 14. The vessel may comprise a drum, bottle, flask, test tube or virtually any closed container suited for accommodating CR A liquid, water-based (aqueous) solvent 16 is also added to vessel 14. The solvent must be immiscible with feed solution 12. Solvent 16 may consist of pure water or, alternatively, an aqueous solution including but not limited to NaCl; bleach or NaOH. Because the water-based solvent 16 and CP feed solution 12 are immiscible, the denser feed solution 12 containing propionitrile PN sinks to the bottom of vessel 14 and the lighter water-based solvent 16 floats above the feed solution along interface 20.

Vessel 14 is agitated vigorously as indicated by double-headed arrows 18. This intermixes solvent 16 and CP feed solution 12. As represented schematically in the subsequent righthand depiction of vessel 14, this mixing causes water-based solvent 16 to absorb and extract at least some of the propionitrile solute 22 from solution 12. Agitation of vessel 14 is discontinued and the immiscible phases 12 and 16 are allowed to separate. The denser phase comprising a raffinate solution 12a, composed of the chloropicrin feed solution and residual propionitrile solute 22, sinks to the bottom of the vessel and an extract solution 16a composed of the water-based solvent and extracted PN solute 22 rises above and floats on the raffinate solution. The phases are again separated along interface 20. Solvent 16 has thereby effectively extracted and acquired PN solute 22 from CP feed solution 12. The PN solute is reapportioned between the two liquid phases 12 and 16 based upon the relative solubility of the propionitrile in each of the chloropicrin and water-based solvent phases.

After the foregoing liquid-liquid extraction has occurred, the aqueous extract solution and raffinate solution are removed from vessel 14. The aqueous solvent and its extracted PN solute 22 may be decanted from vessel 14 as extract solution 16a. The CP feed solution and its residual PN solute 22 comprising raffinate 12a are drawn from vessel 14, as indicated by arrow 25, and deposited in a collection vessel 26. The wet chloropicrin has been in contact with water, which, if left unaddressed, could cause hydrolysis and corrosion in fumigation storage containers and application machinery. The prolonged presence of water also tends to degrade the chloropicrin. Accordingly, the wet chloropicrin may be passed through a dryer 28 to eliminate all residual water from the collected chloropicrin raffinate.

Figure 2:
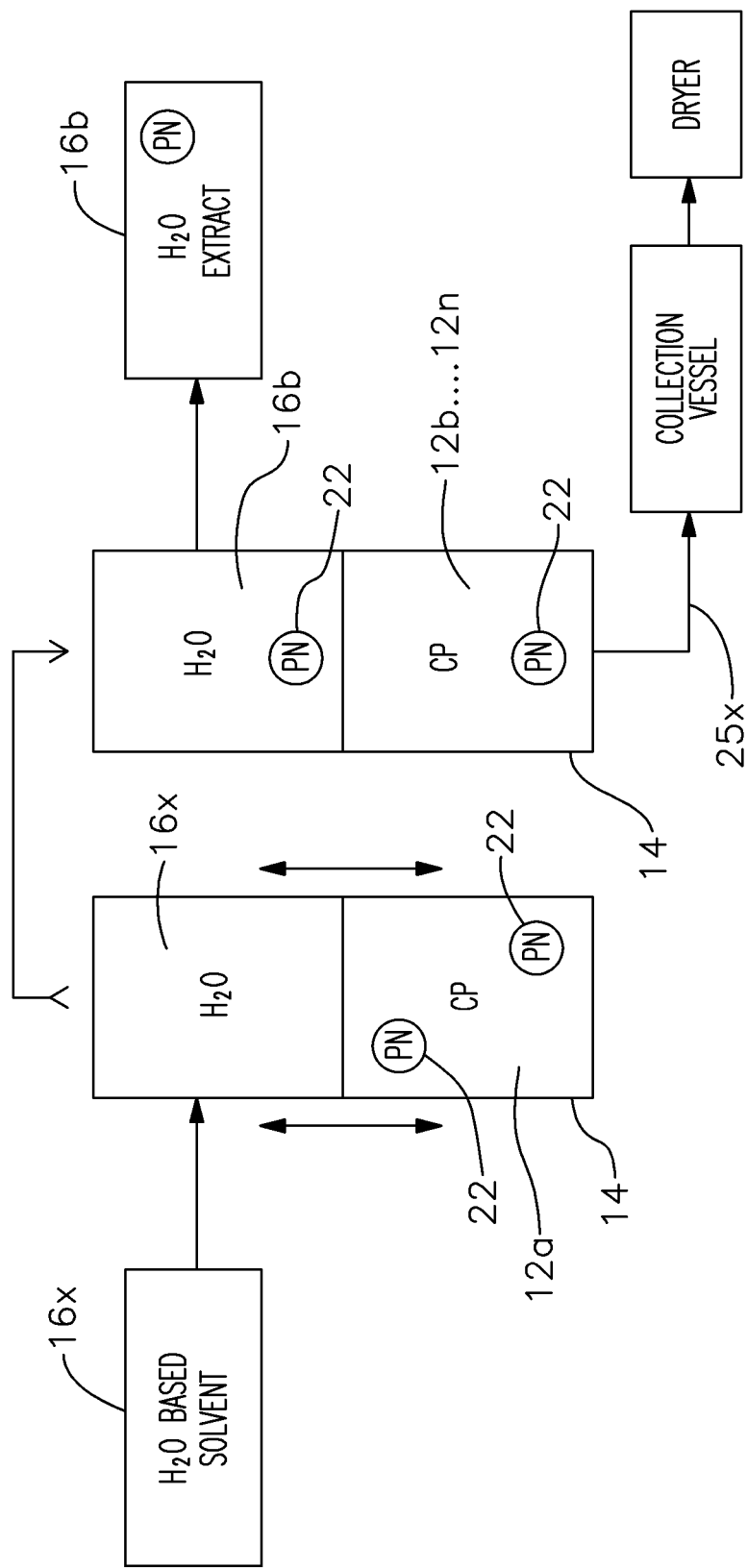
FIG. 2 is a schematic view of an alternative aqueous extraction method wherein an optional second stage batch extraction of propionitrile from the chloropicrin is performed following the initial stage extraction shown in FIG. 1.

As further shown in FIG. 2, additional batch liquid to liquid extractions may be performed on the chloropicrin raffinate 12a before it is discharged from vessel 14, Following the removal of extract 16a (FIG. 1) from vessel 14 by decantation, additional fresh solvent 16x (FIG. 2) may be added to the raffinate 12a in vessel 14, A second extraction analogous to that previously described, may then be performed in vessel 14 between fresh solvent 16(x) and raffinate 12a. Specifically vessel 14 is again vigorously agitated and then allowed to settle so that the immiscible phases separate as shown in the righthand representation of vessel 14 in FIG. 2. This results in a new extract solution 16b which is lower in solute 22 than solution 16a, and a new raffinate 12b which is also lower in residual solute 22 than raffinate 12a. This process may be repeated as many times as necessary to progressively reduce the solute PN content in the raffinate chloropicrin 12a, 12b . . . 12n (wherein n represents the selected number of analogous batch extraction stages performed) until the desired level of residual PN 22 in the chloropicrin is achieved. When the content of residual PN solute 22 is reduced sufficiently, the remaining chloropicrin raffinate may be withdrawn from vessel 14 as indicated by arrow 25x, collected and dried accordingly as described above. This latter variation is known as multistage batch liquid-liquid extraction.

Figure 3:
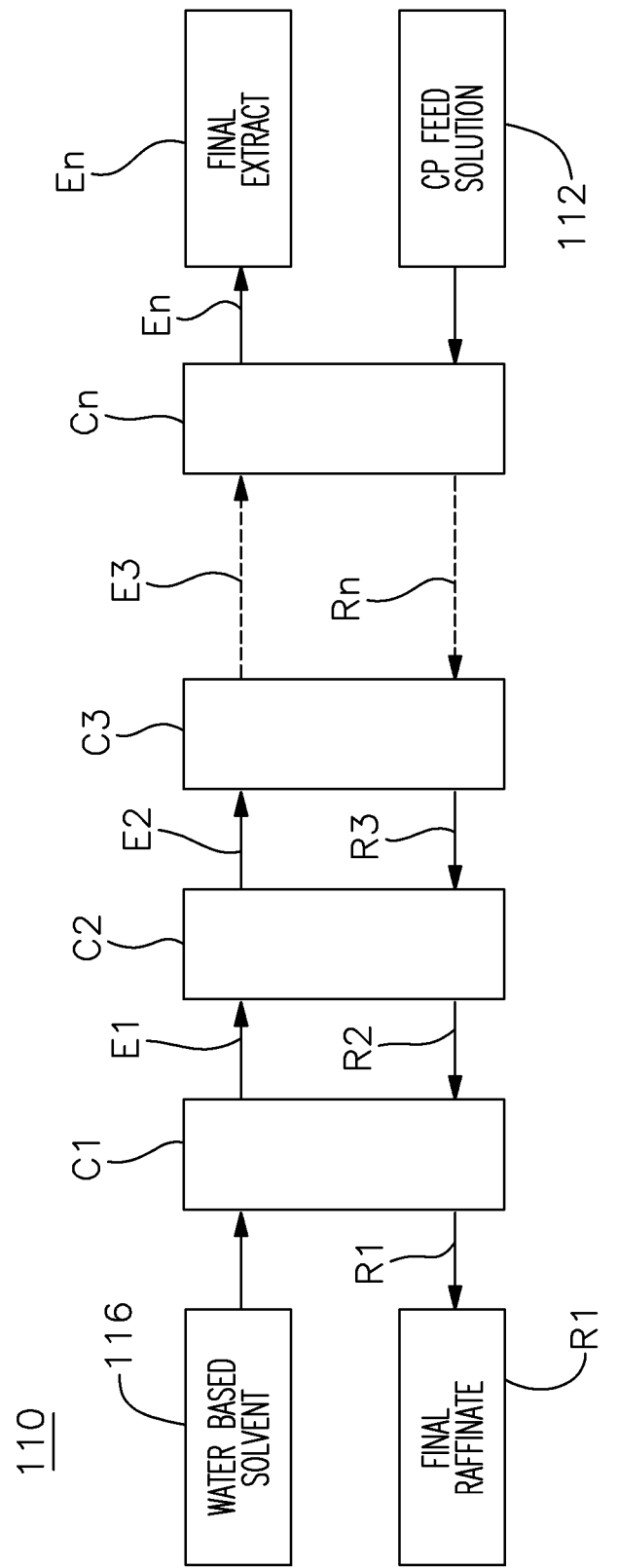
FIG. 3 is a schematic view of the aqueous extraction method being performed using a continuous multistage countercurrent extraction system.

Single or multistage batch liquid-liquid extraction is relatively simple to set up and perform on a small scale, but it is not optimally efficient for commercial purposes. The process of reducing propionitrile content is improved considerably by employing a more efficient multistage, countercurrent batch extraction process as shown in FIG. 3, wherein water-based solvent 116 and CP feed solution 112 are respectively fed at opposite ends and move step wise in opposite directions sequentially through a series of communicably connected extraction vessels or cells C1, C2, C3 . . . Cn. The latter designation Cn represents the final cell in the series and reflects that any selected number of cells may be utilized. In particular, water-based solvent 116 (which again may comprise either a pure water or an aqueous solution) is passed sequentially through cells C1, C2, C3, Cn in the forward direction from left to right as indicated by flows E1, E2 . . . En, and feed solution 112 is fed sequentially through cells Cn-C1 in the opposite or reverse direction from right to left as indicated by flows Rn . . . R2, R1. It should be understood that the terms "first", "forward", "reverse", "rearward", "right" and "left" refer to relative directions in the figure only. At each cell, flow is stopped and a batch extraction is performed between the extract or solvent from the previous cell and the raffinate or feed from the subsequent cell. For example, cell C2 is charged with extract E1 from cell C1 and with raffinate R3 from cell C3. The contents from cell C2 are then mixed and separated in a batch extraction and the extract E2 is discharged to cell C3 while the raffinate R2 is discharged to C1. A similar action occurs in each of the other cells involving the various respective flows from preceding and subsequent cells in like manner to the foregoing example described concerning cell C2. A separate batch extraction occurs in each cell whereby the water-based solvent increases in propionitrile content and the feed chloropicrin solution is depleted in propionitrile. The level of PN solute in the chloropicrin raffinate Rn, R3, R2 and R1 decreases sequentially upon extraction in each cell Cn, C3, C2, C1. The extract E1, E2, E3, En is enriched in PN solute in each cell C1, C2, C3, Cn. As a result, the final extract En is very rich in solute and a minimum amount of solvent is required to achieve the desired level of PN content in the final chloropicrin raffinate R1.

Figure 5:
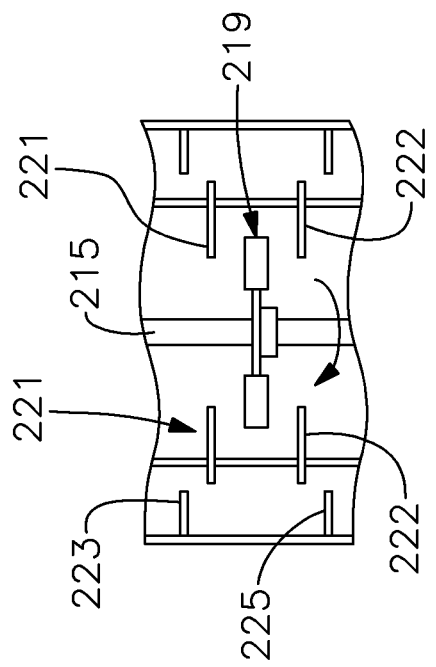
FIG. 5 is a diagrammatic view of a representative segment of the extraction column shown in FIG. 4.
Figure 4:
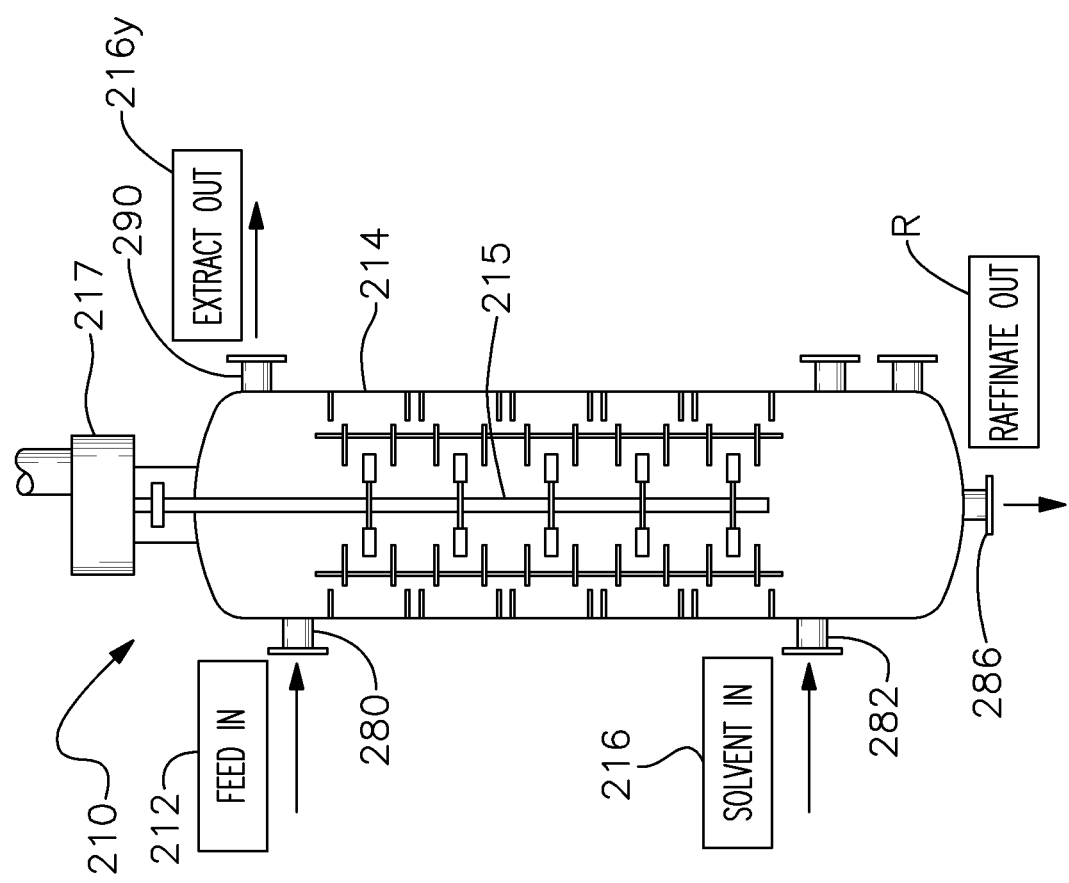
FIG. 4 is simplified diagrammatic view of the method of this invention being implemented in a continuous process using a commercially available liquid-liquid extraction column.

FIGS. 4 and 5 schematically depicts a Scheibel continuous countercurrent liquid-liquid extraction column designed and manufactured by Koch Modular Process Systems. In principle it acts like a multistage counter current batch extraction process; however flow is never stopped such that solvent and feed solution are constantly flowing in and out of any given cell. Column 210 employs a vessel 214 having an interior chamber. An axially rotatable shaft 215 supporting a plurality of turbine impellers 219 extends vertically through the chamber of the vessel 214. Each impeller is mounted to the shaft such that when the shaft turns the impeller rotates between a spaced apart pair of horizontal inner baffles 221, 222. The inner baffles are themselves supported between a respective horizontal pair of upper and lower baffles 223 and 225. Collectively the baffles around each impeller with the impeller comprise a representative stage or cell of this multistage countercurrent liquid-liquid extraction device. A liquid-liquid extraction apparatus design such as a Scheibel column efficiently provides for a very large number of physical extraction stages or cells in a very small space. A Scheibel column might have 30 or more physical stages in a single vessel with a height of only 10 ft. or less. Again, it should be understood that column 210 is commercially available and does not constitute a feature of this invention. Nonetheless, the illustrated liquid-liquid extraction device may be used advantageously to practice the method of this invention as follows.

The CP feed solution 212, as previously described is introduced into the interior chamber of column 210 through an inlet port 280 attached proximate the upper end of the vessel 214. At the same time, a water-based solvent 216 is introduced into the chamber of vessel 214 through a lower inlet port 282. Various selected volumes of feed solution and solvent may be employed. The heavier CP feed solution sinks through the chamber of column 210 and the lighter solvent rises. At the same time, rotary drive 217 is operated to turn shaft 215 and rotate impellers 219. This thoroughly intermixes the solution 212 and solvent 216 as they pass through successive vertical extraction stages or cells defined by the baffles 221, 222, 223 and 225 around each impeller blade 219. As the solution and solvent are mixed, the aqueous solvent draws the PN solute out of the chloropicrin solution. The two phases are immiscible, and the denser and heavier CP solution continues to sink downwardly through the column 210 while the lighter solvent continues to rise. As the respective phases pass upwardly and downwardly through the individual vertical stages of the column, extraction of the PN solute from the CP solution into the solvent takes place analogous to the process of multistage counter current batch liquid-liquid extraction shown in and described in connection with FIG. 3.

In operation, the lighter saturated extract solution containing the solute PN collects at the top of the column above the feed port 280 and is discharged from vessel 214 through port 290. The heavier raffinate solution, depleted of PN solute, collects at the bottom of the column below the solvent port 282 and is discharged from the bottom of the column at port 286. The discharged raffinate R is delivered to a drying system for prompt drying of the chloropicrin as previously described.

It should be understood that various other liquid-liquid extraction mechanisms and equipment might be employed to perform the method of this invention. These include the Kuhni agitated tower, the Karr model or other types of reciprocating plate towers, pulse flow columns, rotating disk columns, centrifugal settlers, perforated plate columns, simple pack columns and even an empty pipe with two liquid streams flowing in opposite directions. The invention may also be practiced using cocurrent continuous liquid-liquid extraction equipment. The construction and operation of such devices will be understood to persons skilled in the art.

In each embodiment disclosed herein, the spent extract solution 16a, 16b, En, 216y may be distilled to remove the PN, solute and regenerate the aqueous solvent. The solvent may then be reused efficiently to perform additional liquid-liquid extraction of PN solute from a chloropicrin feed solution.

The following examples reflect results achieved using the method of this invention:

Example 1

Fifty grams of chloropicrin containing 2245 ppm PN solute was placed in a 250 ml separatory funnel with a solvent comprising 150 g deionized water. The liquids were shaken vigorously for 60 seconds and the mixture was allowed to settle. The extracted chloropicrin solution was removed from the bottom of the funnel. The propionitrile content in the retrieved chloropicrin was measured at 889 ppm.

Example 2

Fifty grams of chloropicrin containing 2018 ppm PN was placed in a 250 ml separatory funnel with 150 grams of deionized water and agitated for 60 seconds. After the mixture settled, the phases were separated and the extracted chloropicrin solution was returned to the funnel with a second 150 gram allotment of deionized water solvent. The funnel was agitated again for 60 seconds and the phases were again separated. The process was repeated and performed a total of five times, each time using 150 g of fresh deionized water solvent for the extraction. After the fifth extraction, the level of PN solute remaining in the final chloropicrin raffinate was reduced to below 10 ppm.

Example 3

A 30-stage pilot Scheibel column as depicted in FIGS. 3 and 4 having dimensions of 6' in height and 80 mm in diameter was assembled and operated. Feed chloropicrin containing 2938 ppm propionitrile was fed continuously into the top inlet of the column at a rate of 0.17 lbs./min while deionized water was pumped into the bottom inlet of the column at a rate of 0.56 lbs./min. The column was operated for a period of 4 hours to reach steady state conditions, after which time the chloropicrin raffinate discharged from the bottom of the column was sampled and the propionitrile content in the discharged chloropicrin was measured at 154 ppm. Accordingly, almost 95% of the PN solute was removed in processing.

The aqueous extraction method disclosed herein provides significant unexpected benefits in relation to the production of high quality chloropicrin. Conventionally, chloropicrin produced from the more economical and commercially available sources of nitromethane will have PN solute levels of 2000 ppm or greater, even after known techniques for reducing the solute have been employed. Employing pure water or an aqueous solution to perform liquid-liquid extraction on the chloropicrin solution enables propionitrile levels to be advantageously reduced to below 200 ppm in an economically efficient and practical manner. Water has never been used to perform such liquid-liquid extraction on chloropicrin and previously such use would be considered counterintuitive and highly impractical. Traditionally, the use of water in and around chloropicrin is avoided because water tends to cause undesirable hydrolysis of chloropicrin. This can significantly degrade the quality of the fumigant and corrode CP storage containers and application equipment. Those problems are avoided in the disclosed method due to prompt and adequate drying of the final raffinate from which an advantageous amount of propionitrile has been removed.

The chloropicrin produced using the method of this invention exhibits a greatly improved quality. Because the propionitrile level has been substantially reduced, the fumigant exhibits fewer harmful effects and is much safer to apply. In certain markets and for certain applications chloropicrin with higher PN levels cannot be used. The method of this invention provides for the ability to manufacture CP for sale to those markets and for those applications using nitromethane that is higher in PN content, but which may have a lower cost and be more readily available. For example, all nitromethane that is manufactured in the US is high in PN content. Low PN content nitromethane is manufactured only in China using a process that is not environmentally friendly. Accordingly, its ongoing availability is not certain. The method of this invention enables the high PN content nitromethane, available in the U.S., to be used efficiently and cost effectively to produce a desired low PN content chloropicrin.

Accordingly, the present invention discloses an aqueous extraction method for effectively and inexpensively reducing propionitrile levels in chloropicrin. Although specific features of the invention are shown in some of the drawings and not others, this is for convenience only, as each feature may be combined with any and all of the other features in accordance with this invention.

What is claimed is:

1. A method of extracting propionitrile from liquid chloropicrin, said method comprising:
    providing a feed solution that includes liquid chloropicrin and a propionitrile solute dissolved therein;
    providing a liquid, water-based solvent that is immiscible with the feed solution;
    intermixing the feed solution and the solvent such that the solvent absorbs and extracts at least a portion of the propionitrile solute from the feed solution; and
    separating the feed solution from the solvent and extracted propionitrile solute to produce a liquid extract and a liquid raffinate, which liquid extract includes the water-based solvent and the propionitrile solute absorbed by the solvent and which raffinate includes the feed solution from which propionitrile solute has been extracted.

2. The method of claim 1 in which said liquid solvent consists of water.

3. The method of claim 1 in which said liquid solvent includes an aqueous solution.

4. The method of claim 1 in which the liquid solvent and feed solution are intermixed in a single stage batch process.

5. The method of claim 1 in which the feed solution is intermixed with liquid solvent multiple times in a multistage batch process.

6. The method of claim 1 in which said liquid solvent and said feed solution are intermixed in a multistage counter current batch process.

7. The method of claim 1 in which said liquid solvent and said feed solution are intermixed in a continuous process.

8. The method of claim 1 in which said liquid solvent and said feed solution are intermixed in a continuous countercurrent process.

9. A method of reducing propionitrile solute in a chloropicrin solution, said method comprising:
    providing a sequential series of communicably connected successive mixing cells;
    transmitting a liquid feed solution that includes chloropicrin containing a propionitrile solute in a first direction sequentially through the successive mixing cells;
    simultaneously transmitting a water-based solvent that is immiscible with the liquid feed solution in a reverse direction sequentially through the successive mixing cells;
    intermixing the feed solution and solvent in each mixing cell such that the solvent extracts and absorbs propionitrile solute from the feed solution, which produces an extract solution having a level of propionitrile that increases progressively within each successive cell in the first direction and which also produces a raffinate solution having a level of propionitrile that decreases progressively within each successive cell in the reverse direction.

* * * * *